United States Patent [19]
Colanzi et al.

[11] Patent Number: 4,770,425
[45] Date of Patent: Sep. 13, 1988

[54] SEALING DEVICE WITH AN ELASTOMERIC RING HAVING TWO SEALING LIPS

[75] Inventors: Franco Colanzi; Angelo Vignotto, both of Turin, Italy

[73] Assignee: RIV - SKF Officine di Villar Perosa, Turin, Italy

[21] Appl. No.: 64,007

[22] Filed: Jun. 19, 1987

[30] Foreign Application Priority Data

Jul. 8, 1986 [IT] Italy .................. 53604/86[U]

[51] Int. Cl.$^4$ .................. F16J 15/34; F16J 15/32
[52] U.S. Cl. .................. 277/153; 277/82; 277/84
[58] Field of Search .................. 277/44–46, 277/81 R, 82, 84, 152, 153, 166, 134

[56] References Cited

U.S. PATENT DOCUMENTS

| | | | |
|---|---|---|---|
| 3,022,081 | 2/1962 | Kosatka | 277/84 X |
| 3,306,683 | 2/1967 | Deuring | 277/153 X |
| 3,363,911 | 1/1968 | McKinven | 277/82 X |
| 3,601,411 | 8/1971 | Bourgeois | 277/82 |
| 4,497,495 | 2/1985 | Christiansen | 277/82 X |
| 4,516,783 | 5/1985 | Mitsue et al. | 277/82 X |
| 4,527,673 | 7/1985 | Szcupak | 277/153 X |

FOREIGN PATENT DOCUMENTS

| | | | |
|---|---|---|---|
| 2414634 | 10/1974 | Fed. Rep. of Germany | 277/84 |
| 881607 | 11/1961 | United Kingdom | 277/153 |
| 2135405 | 8/1984 | United Kingdom | 277/153 |

*Primary Examiner*—Robert S. Ward
*Attorney, Agent, or Firm*—Shlesinger, Arkwright & Garvey

[57] ABSTRACT

A sealing assembly which can be interposed between two relatively movable members to make a seal between the cavity lying between the said members and the exterior environment, composed of two annular elements each of which is firmly connected to one of the said members and on one of which are formed two sliding surfaces perpendicular to one another. The prinipal characteristic of the sealing assembly lies in the fact that it includes an annular sealing element having a sleeve-like lip on which is mounted a resilient element and radially from which extends an annular projection which can slide on one of the sliding surfaces, and a root zone from which extends a second lip independent of and substantially parallel to the first lip and able to slide on the other of the sliding surfaces.

14 Claims, 1 Drawing Sheet

SEALING DEVICE WITH AN ELASTOMERIC RING HAVING TWO SEALING LIPS

BACKGROUND OF THE INVENTION

The present invention relates to a sealing assembly of the two-lip type which can be interposed between two relatively movable members to make a seal between them, preferably, but not exclusively, able to be interposed between the outer and inner rings of a rolling element bearing.

It is known that numerous types of sealing assemblies of the two-lip type exist, which can be interposed between the rings of a rolling element bearing for the purpose of isolating the cavity between the rings themselves and containing the rolling elements, from the surrounding environment in such a way as to prevent the escape of lubricant or the ingress of contaminating agents such as water or dust into the cavity itself.

A first type of known sealing assembly comprises a metal ring of suitable shape which can be force fitted to the outer ring of the bearing and a second ring of elastomeric material provided with two radial lips operable to slide with a predetermined pressure on the outer surface of the inner ring of the bearing in such a way as to exert on it a sliding seal both against external agents which tend to enter into the said cavity, and against lubricant which tends to escape from this.

A second type of sealing assembly comprises two metal rings force-fitted between the bearing rings and a ring of elastomeric material fixed to one of the metal rings and having two lips, one radial and the other axial, which can exert an associated sliding seal on the other metal ring.

The above described sealing assemblies have various disadvantages. In particular, these sealing assemblies are bulky, which is especially unacceptable in applications relating to rolling element bearings. Moreover, if these assemblies are not provided with spring pressure elements the seal can become ineffective with time; on the other hand if spring elements are present these increase the bulkiness especially in the case in which a double seal, both radial and axial is desired, and consequently reduces the space for the lubricant grease and/or renders impossible the provision between the sealing lips of a collection space of sufficient dimensions for this grease, with consequent low durability and efficiency of the seal.

SUMMARY OF THE INVENTION

The object of the present invention is that of providing a sealing assembly which can be interposed between two relatively movable members, which will be free from the stated disadvantages and which will therefore have limited dimensions whilst ensuring an effective seal and a large space for the lubricant grease.

According to the present invention there is provided a sealing assembly which can be interposed between two relatively movable members to seal between a cavity, defined between the said members and the external environment outside the said cavity, of the type comprising a first and a second annular element each of which can be fixedly mounted onto one of the said members and the second of which is provided with a first and a second sliding surface substantially perpendicular to one another; a third annular element formed of elastomeric material projecting directly from the said first annular element; and an elastic element mounted on an external surface of an annular sealing lip of the said third annular element; characterised by the fact that the said sealing lip is shaped as a sleeve co-axial with the axis of symmetry of the said first and second annular element and is provided with a central annular projection extending radially from its inner surface, slidable on the first sliding surface; and by the fact that, in combination, the said third annular element is provided with a second annular sealing lip separated from the said first lip and extending in a direction substantially parallel to this latter; the said second lip being slidable with an end portion on the said second sliding surface and the said elastic element being disposed in such a way as to exert simultaneously on both said sealing lips a force such as to press these respectively against the said first and second sliding surfaces with a predetermined force.

BRIEF DESCRIPTION OF THE DRAWINGS

For a better understanding of the present invention, a preferred embodiment is described below by way of a non-limiting example with reference to the FIGURE which illustrates a partial cross-sectional view of a rolling element bearing provided with a sealing assembly according to the present invention.

DETAILED DESCRIPTION OF THE INVENTION

Figure 1:
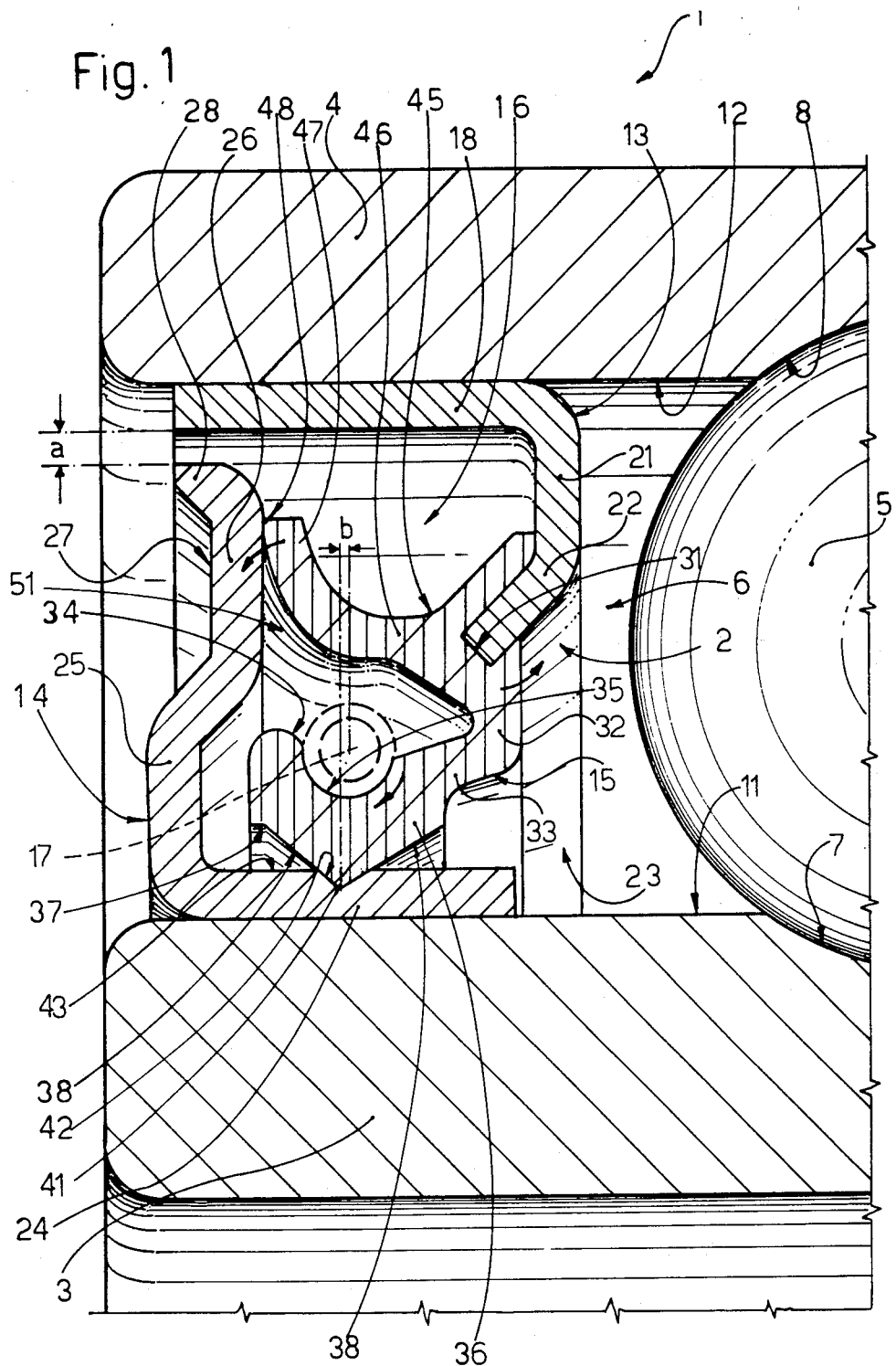

The FIGURE shows a rolling element bearing 1 in which is installed a sealing assembly indicated generally with the reference numeral 2. The bearing 1, comprises an inner ring 3, an outer ring 4 and at least one ring of rolling bodies 5 housed in a cavity 6 lying between the rings 3 and 4. The rolling bodies 5 roll in tracks 7 and 8 formed on an outer surface 11 of the inner ring 3 and on an inner surface 12 of the outer ring 4 respectively. The cavity 6 is closed at its ends (only one of which is illustrated for simplicity, the bearing 1 being symmetrical) by two sealing assemblies 2 interposed between the rings 3 and 4 and only one of which is illustrated.

The sealing assembly 2 comprises a first annular element 13 lightly force fitted to the surface 12 of the outer ring 4, a second annular element 14 lightly force fitted to the surface 11 of the inner ring 3 and co-axial with the element 13, a sealing ring 15 connected to and projecting from the element 13 and housed in a chamber 16 lying between the elements 13 and 14, and an elastic element 17 mounted on the sealing ring 15.

The annular element 13 is made of metal or otherwise rigid material having a high strength and is substantially cup-shape having a side wall 18 parallel to the axis of the element 13 and able to be coupled to the surface 12, and a bottom wall 21 substantially perpendicular to the wall 18 and having a frustoconical portion 22 formed along the edge of a central hole 23 in the wall 21 and tapering towards the interior of the chamber 16.

The annular element 14 is also made of a metal or otherwise rigid material with a high strength and having a sleeve part 24 which can be coupled with the surface 11 and a flange part 25 extending perpendicularly from one end, substantially within the cavity 6, of the part 24. The flange part 25 has an external diameter slightly less than the internal diameter of the wall 18 of the element 13 in such a way as to define an annular aperture between the cavity 6 and the chamber 16 of predetermined width and indicated in the drawing with a. Peripherally of the part 25 there is formed an annular projection 26 the convexity of which faces towards the interior of the chamber 16 and which defines an annular recess 27 facing out from the cavity 6. The part 25 has an annular perimetral border 28 having a sharp corner from which the projection 26 extends and which is delimited towards the recess 27 by a conical surface diverging with respect to the axis of the element 14.

The sealing ring 15 is on the other hand made of an elastomeric material such as rubber or synthetic plastics resin, and is joined to the annular element 13 in correspondence with the central hole 23 of this latter in any convenient manner, such as for example by means of vulcanisation. In particular, the portion 22 of the element 13 is partially incorporated into the element 15 being contained in a recess 31 formed within this latter. The ring or sealing element 15 includes a root zone 32 in which the seat 31 is formed, and a sleeve-shape lip 33 substantially perpendicular to it, having an axis of symmetry coincident with the axes of the elements 13 and 14 and extending longitudinally and projecting from the portion 32 towards the flange part 25 of the element 14; on an outer surface 34 of the lip 23 is formed an annular seat 35 for housing the elastic element 17, which in the drawing is illustrated in broken outline and which is constituted by a coil spring wound in a ring above the sleeve-like lip 33 in such a way as to exert on this latter a force substantially perpendicular to the axis of the ring 15.

The sleeve lip 33 of the ring 15, which in use is co-axial to and external of the sleeve part 24 of the element 14, has in longitudinal section a substantially V-shape being provided centrally with an annular internal projection 36 extending in a radial direction, formed integrally with the lip 33 projecting from an internal surface 37 thereof. The projection 36 is delimited by two oblique walls 38 which join one another at a vertex 41, and is able to slide on a track 42 formed on an outer surface 43 of the part 24 within which it is housed upon assembly.

According to the invention the element 17 is disposed with its axis of longitudinal symmetry off-set with respect to the position of the vertex 41 and in particular is displacted eccentrically towards the root portion 32 with respect to the vertex 41 by an amount b measured along the longitudinal axis of the lip 33 in such a way that the point of application of the elastic force which the element 17 exerts on the ring 15 is off-set along the axis of symmetry of this latter with respect to the fulcrum constituted by the vertex 41 by just this amount b towards the root zone 32.

In combination with this characteristic, the sealing element 15 further includes a second annular lip 45 extending from the common root zone 32, independently of the lip 33, in an axial direction co-axially with the lip 33 itself and towards the flange part 25. The lip 45 has a first section 46 parallel to the lip 33 and a second, deformable section 47 folded radially outwardly and an end portion of which is slidable on a surface 48 facing towards the ring 15 of the flange part 25 and, in particular, on the surface 48 of the projection 26 against which the end of the section 47 engages upon assembly. It is to be noted that by the conformation of the ring 15 a relatively large annular space between this and the ring 14 is defined, which divides the chamber 6 from the ambient environment outside the bearing 1. In use, the space 51 is filled with grease to increase the sealing action and lubricate the sliding seals.

The element 17 presses the lip 33 onto the sleeve part 24 of the element 14 with a predetermined pressure, and in particular presses the vertex 41 against the track 42. In this way the ring 15 forms a radial seal with respect to the exterior of the space 51 and this inhibits the infiltration of external contaminating agents into the cavity 6 as well as the escape of lubricant from this. Because of the offset between the lines passing through the vertex 41 and the point of application of the force of the element 17, this latter is not limited to a radial thrust action, but also simultaneously causes a rotation towards the sleeve part 24 of the element 14 of the lip portion 33 nearest to the root zone 32 in the direction of the arrow. Because of this deformation and the described shape of the element 15, in this latter is obtained a rocking effect which consists of a series of rotations induced in the direction of the arrows by the moment generated because of the displacement b of the spring 17, rotations which deform the element 15 in such a way as to press the lip 46 axially against the surface 48. By this rocking effect, in fact, the lip 45 is biased towards the sleeve lip 33, but in this way the section 47 of the lip 45 does no more than press harder on the surface 48 of the flange part 25 of the element 14. There is thus formed, simultaneously with the above, also an axial seal between the chamber 16 and the space 51 and the ingress of contaminants into the space 51 is therefore also obstructed.

Among other things it is to be noted that by the restricted width of the aperture which puts the chamber 16 into communication with the exterior of the bearing, there is also formed a labyrinth seal with a braking action both on possible escape of lubricant from the space 51 and on the ingress into the chamber 16 of possible contaminating agents. It is to be noted, finally, that the form of the edge 28 and the shape of the recess 27 increase the braking action with respect to the ingress of contaminants and the escape of lubricant from the chamber 16. In fact, by the effect of the relative rotational movement between the rings 3 and 4 the contaminants collect in the recess 27 from where they are projected outwardly away from the chamber 16 by the tapering form of the edge 28 which acts as a centrifuge.

From what has been described above the advantages achieved with the structure of the present invention are evident. In particular, it permits sealing assemblies to be formed with simultaneous, equally effective action both against the possible lubricant which would try to escape and against external contaminants, the whole with a limited axial dimension thanks to the position of the sliding seals. Moreover, the sliding seals are formed one in an axial direction and one in a radial direction and both are exerted thanks to the action of a single elastic element. However, the axial sealing lip is rendered independent from that of the radial seal and is disposed a considerable distance from this thus permitting a larger chamber for lubricating grease to be obtained, which improves the seal and prolongs the life of the assembly as well as facilitating its construction.

Finally, it is clear that the sealing assembly 2 can be modified and varies without by this departing from the protective ambit of the present invention.

In particular the sealing assembly 2 can be interposed between any pair of relatively rotatable members, and the elements 13 and 14 can be fixed to these members in any convenient way, such as, for example, by means of suitable snap-engaging fixing means or otherwise, such as elastic rings, ring nuts, shoulders and the like. Moreover, it is possible to form on the surface 48 of the flange part 25 a track of suitable shape in which the end of the section 47 of the lip 45 can slide.

We claim:

1. A device for sealing-off a cavity formed between two coaxially disposed external and internal members, comprising:
   (a) a first annular element extending radially inwardly from the internal periphery of the external member;
   (b) a second annular element extending radially outwardly from the external periphery of the internal member such that said first and second annular elements define a chamber therebetween;
   (c) a third annular element positioned in said chamber between said first and second annular elements;
   (d) said third annular element comprising a root portion, and a first sealing lip and a second sealing lip extending therefrom;
   (e) said first and second sealing lips extending substantially parallel to each other in the same direction;
   (f) each of said first and second annular elements including an axially extending sleeve portion and a radially extending projection extending from said sleeve portion;
   (g) said second annular element including an outer surface and an inner surface;
   (h) said first sealing lip including a free end portion sliding on the inner surface of said projection of said second annular element;
   (i) said second sealing lip including an annular projection having a vertex;
   (j) said vertex sliding on the inner surface of said sleeve portion of said second annular element;
   (k) said projection of said second sealing lip including an annular seat disposed opposite to said vertex;
   (l) a resilient element positioned in said annular seat for exerting simultaneously a pressure on a portion of the inner surface of said sleeve portion of said second annular element and on a portion of said projection of said second annular element; and
   (m) said resilient element is positioned so as to be axially off-set from said vertex towards said root portion by a predetermined distance measured along the inner surface of said second annular element.

2. The device of claim 1, wherein:
   (a) said resilient element comprises a coil spring.

3. The device of claim 1, wherein:
   (a) said free end portion of said first sealing lip being folded radially towards the external member.

4. The device of claim 1, wherein:
   (a) said sleeve portion of said first annular element being opposite to said sleeve portion of said second annular element;
   (b) said projection of said first annular element being opposite to said projection of said second annular element;
   (c) the end portion of said projection of said second annular element and the end portion of said sleeve portion of said first annular element defining an annular aperture therebetween; and
   (d) said aperture being in communicaiton with said chamber on one side and being open to the exterior on the other side.

5. The device of claim 1, wherein:
   (a) said second sealing lip is co-axial with said first and second annular elements.

6. The device of claim 1, wherein:
   (a) said first and second sealing lips of said third annular element defining an annular space therebetween for filling with a lubricating agent.

7. The device of claim 1, wherein;
   (a) a plurality of rolling members are positioned on one side of the sealing device between the external and internal members; and
   (b) said root portion of said third annular element being adjacent to said rolling members.

8. The device of claim 1, wherein:
   (a) said root portion of said third annular element comprising a groove for receiving the end portion of said projection of said first annular element.

9. The device of claim 1, wherein:
   (a) said first annular element is made of a metal material.

10. The device of claim 1, wherein;
    (a) said second annular element is made of a metal material.

11. The device of claim 1, wherein:
    (a) said third annular element is made of an elastomeric material.

12. The device of claim 11, wherein;
    (a) said elastomeric material is rubber.

13. The device of claim 11, wherein:
    (a) said elastomeric material is a synthetic resin.

14. A device for sealing-off a cavity formed between two coaxially disposed external and internal members, comprising:
    (a) a first annular element extending radially inwardly from the internal periphery of the external member;
    (b) a second annular element extending radially outwardly from the external periphery of the internal member such that said first and second annular elements define a chamber therebetween;
    (c) a third annular element positioned in said chamber between said first and second annular elements;
    (d) said third annular element comprising a root portion, and a first sealing lip and a second sealing lip extending therefrom;
    (e) said first and second sealing lips extending substantially parallel to each other in the same direction;
    (f) each of said first and second annular elements including an axially extending sleeve portion and a radially extending projection extending from said sleeve portion;
    (g) said second annular element including an outer surface and an inner surface;
    (h) said first sealing lip including a free end portion sliding on the inner surface of said projection of said second annular element;
    (i) said second selaing lip including an annular projection having a vertex;
    (j) said vertex sliding on the inner surface of said sleeve portion of said second annular element;
    (k) said projection of said second sealing lip including an annular seat disposed opposite to said vertex;
    (l) a resilient element positioned in said annular seat for exerting simultaneously a pressure on a portion of the inner surface of said sleeve portion of said second annular element and on a portion of said projection of said second annular element;
    (m) said projection of said second annular element including a peripheral end portion having a thickness decreasing towards the edge thereof;
    (n) said second annular element including an annular recess on said outer surface thereof; and
    (o) said recess being limited by said end portion on one side thereof.

* * * * *